United States Patent

[11] 3,628,231

| | | |
|---|---|---|
| [72] | Inventor | James J. Pancook<br>Tonawanda, N.Y. |
| [21] | Appl. No. | 803,370 |
| [22] | Filed | Feb. 28, 1969 |
| [45] | Patented | Dec. 21, 1971 |
| [73] | Assignee | Houdaille Industries, Inc.<br>Buffalo, N.Y. |

[54] MACHINE TOOL HAVING TOOL LOADER AND UNLOADER
27 Claims, 7 Drawing Figs.

[52] U.S. Cl.................................................. 29/243,
29/568, 83/552, 83/563
[51] Int. Cl......................................................... B23p 19/04
[50] Field of Search.......................................... 29/243,
568; 83/143, 552, 559, 560, 563

[56]             References Cited
               UNITED STATES PATENTS
3,288,032  11/1966  Pankonin et al. ............. 29/568 X 3,548,480  12/1970  Daniels........................ 29/243

*Primary Examiner*—Andrew R. Juhasz
*Assistant Examiner*—Z. R. Bilinsky
*Attorney*—Hill, Sherman, Meroni, Gross & Simpson ABSTRACT: A machine tool has a tool loader and unloader for inserting and ejecting tooling into the movable tool station of a machine tool remotely from its work station, for example into the turret of a punch press. A fluid actuator operates raising and lowering means that include concentric tool support surfaces piloted against rotation and having nests for receiving tooling of various sizes, one of such nests being rotatable for angularly positioning shaped tooling. Coacting therewith is tool ejection means that employs a single fluid actuator for reciprocating a tooling support plunger and a tooling ejecting plunger, there being a driving connection between the plungers enabling relative reciprocation thereof.

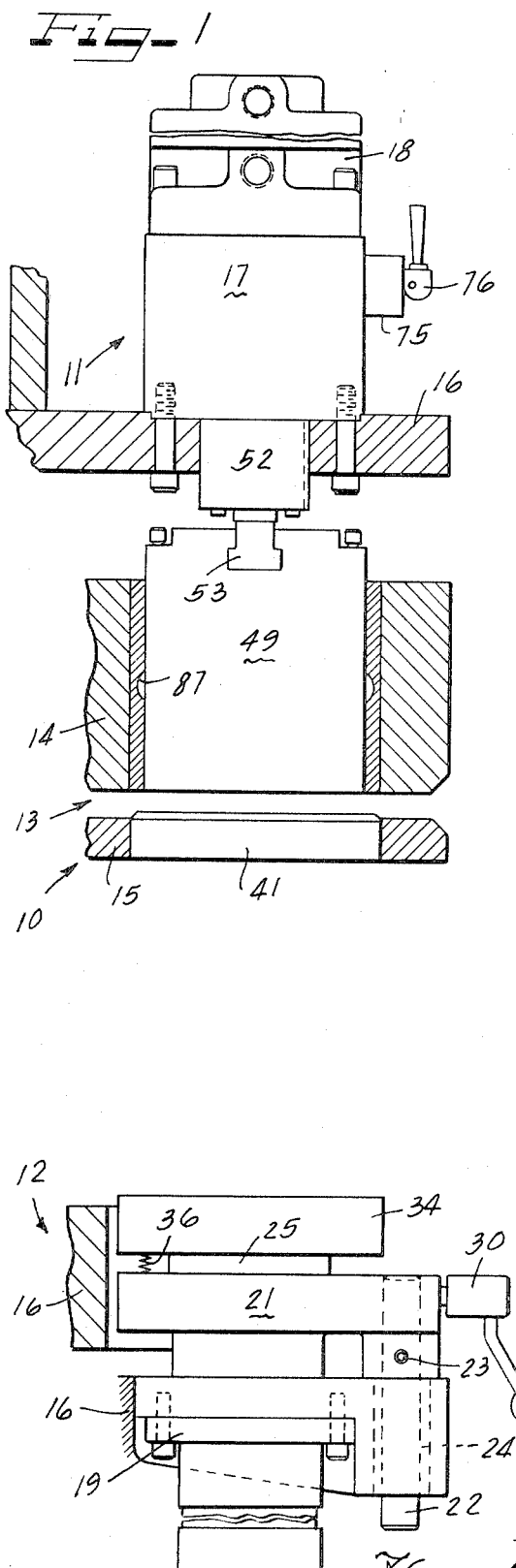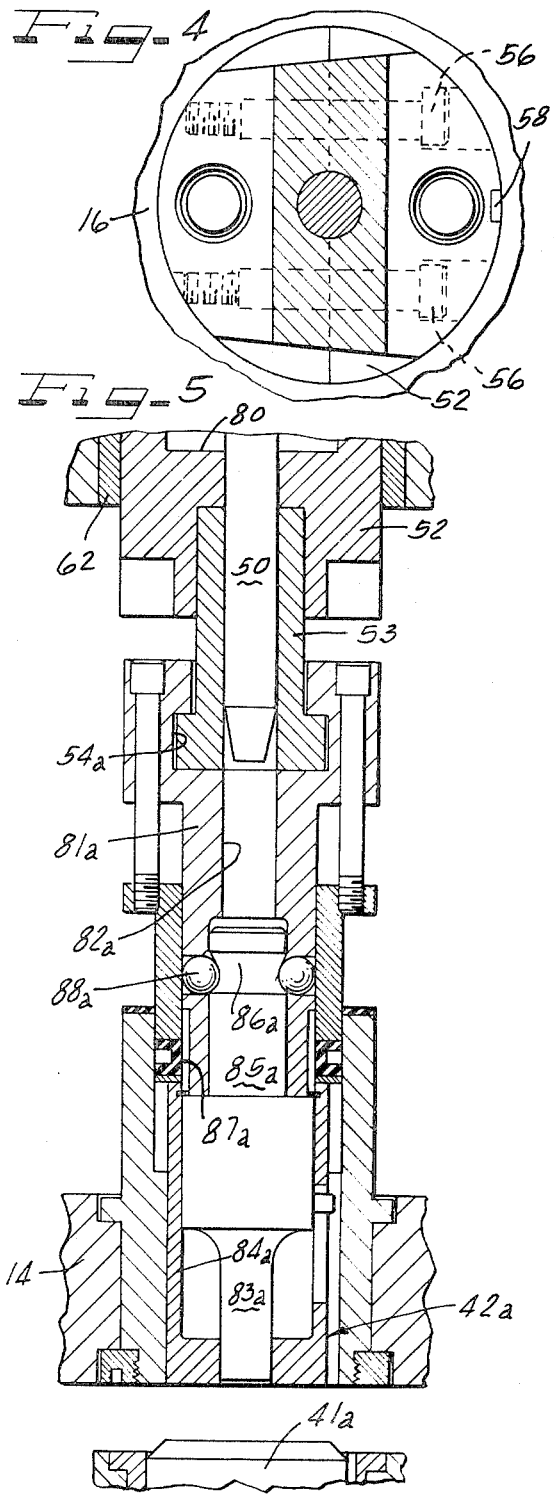

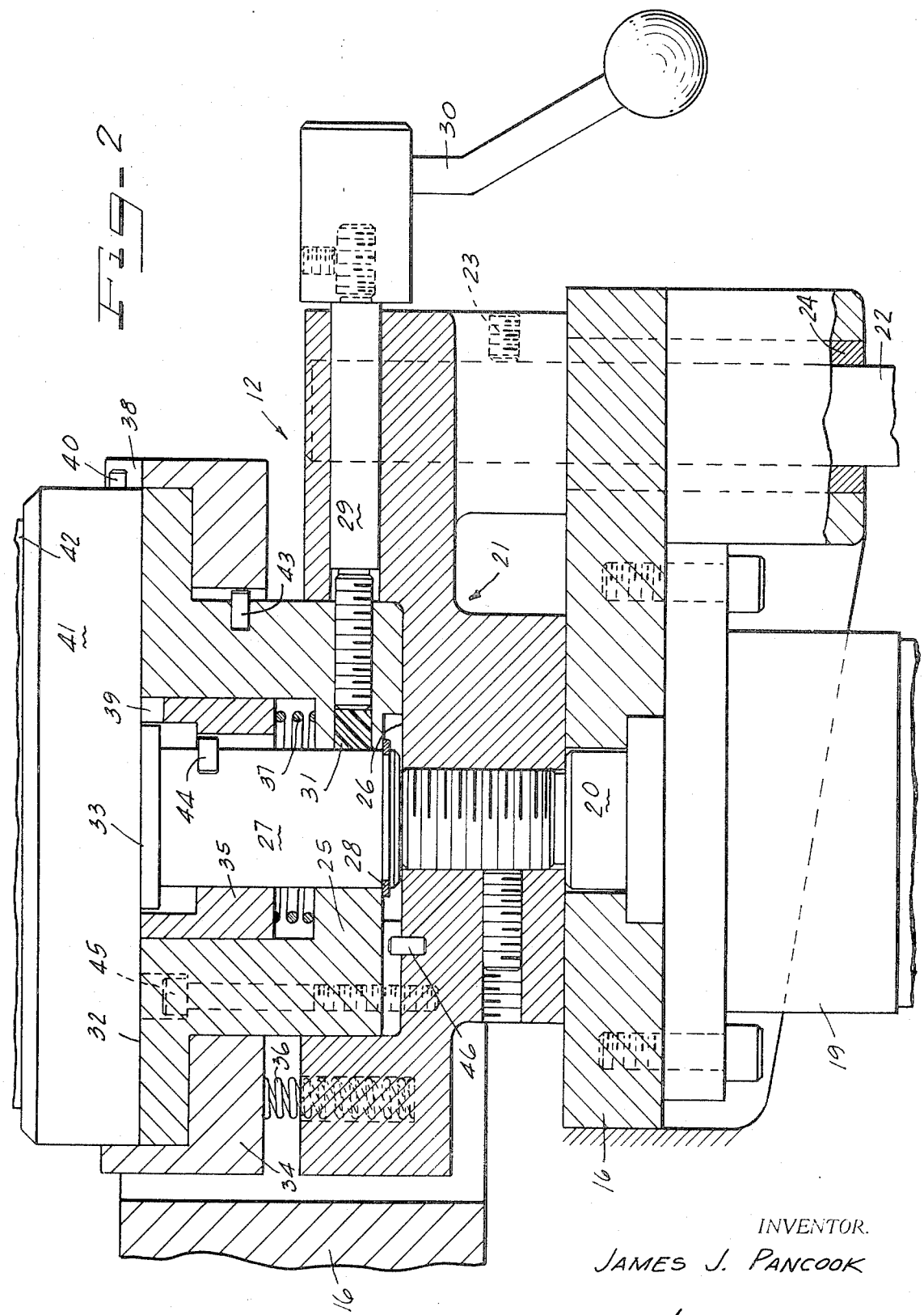

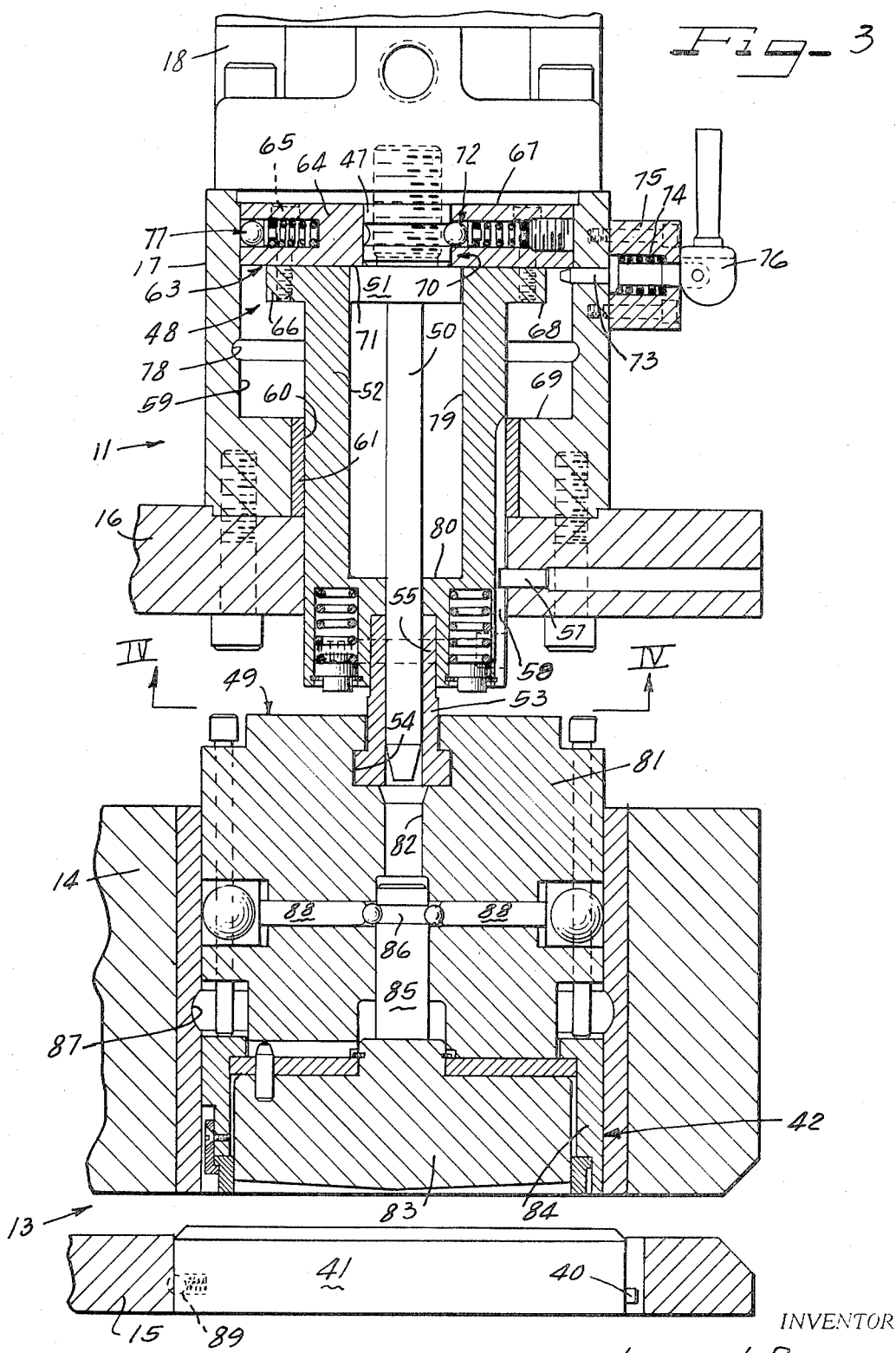

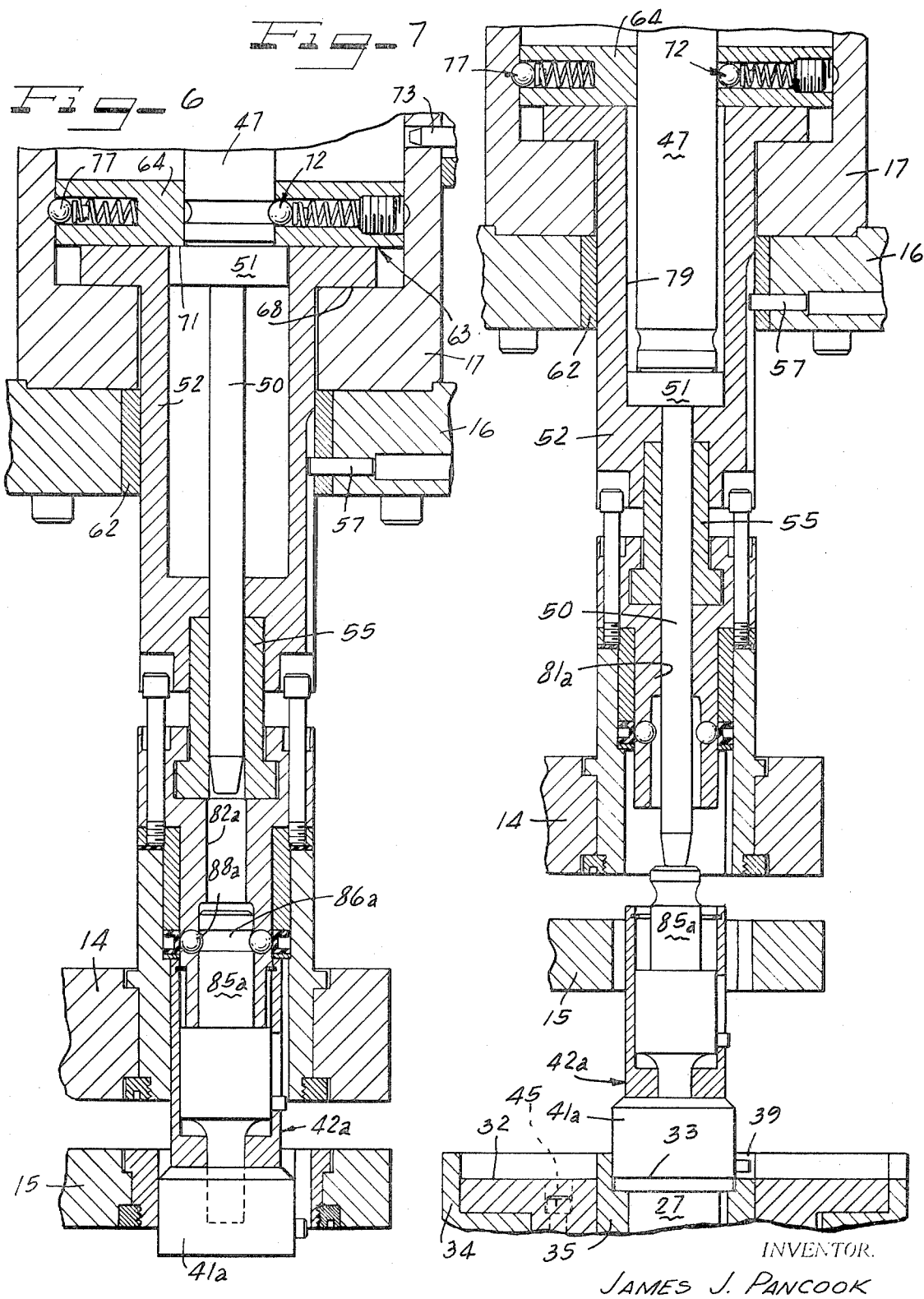

3,628,231

MACHINE TOOL HAVING TOOL LOADER AND UNLOADER

BACKGROUND OF THE INVENTION

1. Field of the Invention

The present invention is directed to a machine tool having a tool loader and unloader, particularly one comprising a tool raising and lowering device and a tool injection means.

2. Prior Art

In machine tools, for example in a turret-type of punch press, as the tooling increases in size, the time and effort needed to change tools has substantially increased, the location of such tooling in a machine tool at times also being awkward to reach.

SUMMARY OF THE INVENTION

The tool loader and unloader has a raising and lower portion with a pair of concentric upwardly directed tool-support surfaces fixedly secured to a piston rod, constructed as a nest, one of which nests can be selectively rotated, and means secured to a further piston rod for both reciprocating a tool assembly and ejecting a tool wherein a tool ejecting plunger drives a tooling support plunger.

Accordingly, it is an object of the present invention to provide a machine tool having a tool loader and unloader station for removing tooling from the machine tool and for inserting tooling in its place.

Another object of the present invention is to provide a tool loader by which noncircular or shaped tooling may be inserted with the noncircular configuration accurately angularly oriented with respect to the machine tool.

A still further object of the present invention is to utilize a single fluid actuator to provide both the function of reciprocating the tooling and the function of ejecting a tool from such tooling.

A still further object of the present invention is to provide a machine tool having a tool loader and unloader which is capable of cooperating with various embodiments of tooling and tools. Yet another object of the present invention is to provide a tool loader and unloader for a turret-press type of machine tool wherein the tool loader and unloader simultaneously handles the tools to be used in both turrets.

Many other advantages, novel features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

FIG. 1 is a fragmentary side view of a machine tool, partially illustrated in cross section, having a tool loader and unloader constructed in accordance with the present invention;

FIG. 2 is an enlarged vertical cross-sectional view of the tool raising and lowering means which forms the lower portion of FIG. 1;

FIG. 3 is an enlarged vertical cross-sectional view of the upper portion of FIG. 1 showing the tool ejection means along with representative tooling;

FIG. 4, appearing with FIG. 1, is a cross-sectional view taken along line IV—IV of FIG. 3;

FIG. 5 is a fragmentary cross-sectional illustration of substantially the structure of FIG. 3 shown in conjunction with other representative tooling illustrating both the beginning of unloading and the finish of loading tooling;

FIG. 6 is a cross-sectional view of the structure of FIG. 5 with the tooling partially removed; and FIG. 7 illustrates the structure of FIG. 5 where the tooling is fully unloaded.

AS SHOWN IN THE DRAWINGS

The principles of the present invention are particularly useful when embodied in a machine tool such as a turret-type of punch press illustrated in FIG. 1 and generally indicated by the numeral 10. The machine tool 10 is provided with a tool loader and unloader station which has an upper portion 11 and a lower portion 12, in alignment with one another and in alignment with tool-receiving station 13 on the machine tool or punch press 10, the tool station 13 here comprising a pair of turrets 14, 15 having socket openings receptive of tooling. The upper portion 11 of the tool loader and unloader is secured to a frame 16 which is fixed and which supports the turrets 14, 15 and which also supports the lower portion 12 of the tool loader and unloader station. The turret 14, 15 may be rotated so that various tool stations may be positioned in alignment with the tool loader and unloader 11, 12 and where the machine tool is of a different type, this mechanism can be used to advantage with certain constructions of single-station machine tools, for example where the tool station 13 is at least in part supported in tool-support structure such as shown in U.S. Pat. No. 3,270,605.

The upper portion of the tool loader and unloader includes a housing 17 secured to the frame to which is secured a double-acting fluid actuator 18. The lower part of the tool loader and unloader includes a lower linear fluid actuator 19 secured to the frame 16 and constructed as shown in detail in FIG. 2.

The lower portion 12 of the tool loader and unloader constitutes tool raising and lowering means driven by the lower linear fluid actuator 19. The fluid actuator 19 has a piston rod 20 shown in retracted position, the projecting end of which is threaded into a housing 21 which is reciprocated by the actuator 19. A pilot rod 22 is secured as by a setscrew 23 to the housing 21 and extends slidably through a bearing 24 carried on the frame 16 so that the pilot rod is parallel to and offset from the piston rod 20. The housing 21 is generally cup-shaped and has a further generally cup-shaped portion 25 received in a recess 26. The portion 25 has a recess which receives a selectively rotatable portion 27 of the housing 21, the portion 27 being rotatably disposed in the portion 25 and retained by a snap ring 28. After the selectively rotatable portion 27 has been rotated about the rod axis, its selected position can be locked by means of a lock member 29 which is rotatably guided by the housing 21 and is also threaded into the housing portion 25. For convenience, a handle 30 is secured to the lock member 29 for loosening and tightening such lock member, there being a nylon plug 31 acting between the lock member and the rotatable portion 27 of the housing 21. It is to be noted that rotation of the selectively rotatable portion 27 does not alter its axial position. The housing 21 has a pair of concentric tool support surfaces 32, 33 which are directed upwardly, the tool support surface 32 being on the housing portion 25 and the tool support surface 33 being on the rotatable housing portion 27. The tool support surfaces 32, 33 are thus both disposed in fixed relation to the piston rod 30 and are coplanar with each other. The tool support surface 32 is surrounded by a flange member 34 and the tool support surface 33 is surrounded by a further flange member 35, both slidably supported on the housing 21 in encircling relation to the respective tool support surfaces 32, 33. Spring means are provided which urge the pair of flanges in an upward direction, and to this end, a series of springs 36 act between the housing 21 and the flange 34, only one of such springs being illustrated. A further spring 37 acts between the housing portion 25 and the flange member 35 and urges it also upwardly to project (FIG. 7). The upper edges of the flanges 34, 35 are thus normally coplanar with each other while both of the flanges 34, 35 can be yieldably depressed, as by engagement with the tool station 13 so that their upper edges are flush with the tool support surfaces, as is illustrated in FIG. 2 in the instance of the tool support surface 33.

Each of the flanges 34, 35 has a keyway 38, 39 for coacting with a key 40 on a die tool 41. If desired, such keying could be reversed. When this invention is utilized, the die 41 mates with the punch tool 42 and serves to key it. In order to hold each of the flange members 34, 35 in proper angular position, keying is provided as at 43 between the housing and the flange member 34, and as at 44 between the housing portion 27 and the flange member 35. In order that the keying 43 shall be in a proper predetermined position, the housing portion 25 is fixedly secured as by a number of screws, one of which is shown at 45. During initial construction or setup, it may be advantageous to employ an additional key 46, but this is not used once the initial alignment is obtained. The position of the keying 44 is manually selected and then locked by the lock member 29. Such manual selection may be augmented by a fixture that determines the proper angular relationship between a keyway in the turret 13, by suitable angular graduations that indicate the position of the flange member 35, the angular graduations on the punch press turret, or the like.

The tools 41, 42 are manually placed on the tool raising and lowering means 12 and the actuator 19 is then supplied with fluid power to elevate the tooling so that the tool support surface 32 engages or is flush with the lower side of the lower turret 15. Conversely, where the structure is utilized to unload the tools 41, 42, the tool raising and lower means 12 is first raised to that position and allowed to recede as the tool ejection means 11 force the tools out of the turrets 14, 15 and against the tool raising and lowering means 12, as more fully explained below.

As shown in FIG. 3, the frame 16 supports the housing 17 to which the upper linear fluid actuator 18 is secured, such structure and the internal components constituting the tool ejection means 11. The linear fluid actuator 18 has a piston rod 47 which is secured means 48 for reciprocating a tool assembly 49 and means for ejecting the tool 42 which forms part of the tool assembly 49, such ejecting being in response to reciprocation of the piston rod 47. To this end, the means 48 includes a tool ejecting plunger 50, the upper end of which is threaded into the piston rod 47, the plunger 50 having an enlarged head 51 external to the actuator which is thus disposed against the piston rod 47. The reciprocating and ejecting means 48 further includes a tooling support plunger 52 which has a coupling means 53 at its lower end for engaging with the tool assembly 49. In this embodiment the tool assembly 49 includes a T-slot 54 and the coupling means 53 constitutes a T-head which has a shank 55 that extends upwardly into a split portion of the lower end of the tool support plunger 52 where the same is clamped by a pair of screws 56. To prevent rotation of the tooling support plunger 52 about the vertical axis, keying is provided which includes a key 57 carried by the frame 16 and projecting into a keyway 58 in the tooling support plunger 52. The housing 17 has a pair of concentric bores 59, 60 by which the tooling support plunger 52 is guided for reciprocation. The bore 60 is in the form of a bearing 61 which may, if desired, be carried in the frame 16 as shown in FIGS. 5–7 at 62. With reference again to FIG. 3, the tooling support plunger 52 has an enlarged head 63 which is external to the actuator 18, the enlarged head 63 in this embodiment comprising a circular plate 64 secured by a number of screws 65 to a flange 66 at the upper end of the tooling support plunger 52. The enlarged head 63 is engageable at its upper surface 67 with the lower end of the actuator 18, and at its lower surface 68 with another abutment 69 within the housing 17. The lower end of the actuator 18 thus constitutes along with the surface 69, a pair of spaced fixed abutments which limit the travel of the tooling support plunger 52.

There is a driving connection generally indicated at 70 between the tool ejecting plunger 50 and the tooling support plunger 52. The driving connection 70 in part includes in this embodiment the head 51 carried by the tool ejecting plunger 50 which has an upper surface that engages a downwardly directed annular shoulder 71 on the circular plate 64. When the piston rod 47 is raised, that is retracted, then the head 51 engages the annular shoulder 71 to form a driving connection therebetween for a raising the tooling support plunger 52. The driving connection 70 further includes detent means 72 by which the plungers 50, 52 are connected for joint movement in a downward direction. To this end, the circular plate 64 is typically provided with four such detents as shown at 72 which collectively hold the tooling support plunger 52 in the position illustrated with respect to the position rod 47 so that when the piston rod 47 is lowered to drive the tool ejecting plunger 50 downwardly, the tool support plunger 52 is likewise driven downwardly.

In the event that fluid pressure were lost in the fluid actuator 18, the mass of the tool assembly 49 and of the plungers 50, 52 would cause such structure to move downwardly. To prevent any such movement, there is provided a retractable pin 73 guided by the housing 17 for projecting through the bore 59 to a position beneath the enlarged head 63. Thus, the pin 73 coacts with the tooling support plunger 52 to hold it in the raised or retracted position, and the detents 72 further serve to hold the tool ejecting plunger 50 and the piston rod 47 in the raised position. If it is ever desired to lower only the tool ejecting plunger 50, the retractable pin 73 may be left in the extended illustrated position, whereby the actuator 18 will overpower the detents 72 to reciprocate solely the tool ejecting plunger 50. In ordinary usage described below, such operation is not necessary. The retractable pin 73 is biased by a spring 74 which acts between a shoulder on the pin 73 and a cap 75 in response to actuation of a cam-type of handle 76.

The tooling support plunger 52 has a further set of detents 77, such as four such detents, one of which is illustrated. The detents 77 are carried in the circular plate 64 and act radially outwardly against the bore 59. A number of sockets are provided for the various balls of the detents 77, and for convenience, the such sockets are connected together in the form of a continuous internal groove 78 which is so located that the detents 77 act to lock the tooling support plunger 52 in its lowermost or extended position.

As noted, the tooling support plunger 52 has an internal bore 79 within which the head 51 of the tool ejecting plunger 50 is reciprocable. The lower end of the bore 79 constitutes an annular shoulder 80, against which the head 51 may engage. Thus, the head 51 is disposed between the fixed abutments 71, 80 on the movable tooling support plunger 52, and after the tooling support plunger 52 has reached its limit of travel, such fixed abutments 71, 80 serve to limit the travel of the tool ejecting plunger 50. It is preferably that travel be limited in this manner so that exactly the proper travel is achieved as may be necessitated by a particular tool assembly 49. Thus, commercially available linear fluid actuators 18 can be employed that have virtually any stroke of adequate amount. Alternatively, the inherent limits of travel of the piston of the actuator 18 may be employed in lieu of the travel limiting function of the spaced annular shoulders 71, 80 that encircle the tool ejecting plunger 50.

For a full understanding of the operation of the tool loader and unloader 11, 12, there follows a brief description of the reciprocable tool assembly 49. A body 81 has the T-slot 54 through which a central bore 82 extends. The tool 42 constitutes a punch and stripper assembly including a punch 83 and stripping sleeve 84, there being a shank 85 secured to the punch and extending into the bore 82. The shank 85 has a groove 86 while the bore in the turret 14 has a groove 87. A reciprocable tool retainer 88 having a ball at each end normally extends into the groove 86 to prevent withdrawal of the shank 85. However, when the tool assembly 49 is lowered so that the retainer 88 is in alignment with the groove 87, the retainers 88 may move radially outwardly and release their grip on the shank 85. When the shank 85 is so released, the tool 42 will move by gravity out of the illustrated position. However, the presence of oil may hold the tooling in position and the action of the tool ejecting plunger 50 will overcome any such holding force and will also force the retainers 88 radially outwardly. The tool 42 has its punch portion 83 received into the opening of the die 41 so that both the tool 41 and the tool 42 may move jointly downwardly.

In connection with describing operation of the tool loader and unloader 11, 12, the same has been illustrated in conjunction with another style of tooling which operates in a similar manner, and for that reason similar reference numerals, but with the suffix a added, have be utilized in FIGS. 4-7. In this embodiment, the retainer 88a can move radially outwardly into a groove within which there is located a resilient element 87a. FIGS. 5-7 also illustrate the angularly adjustable keyway construction in the turret described above.

FIG. 5 illustrates the relative position of the parts of the tool loader and unloader 11, 12 just before unloading is to begin or just after loading has ended, and to that end is identical in position to that of FIG. 3. In order to change a tool in a tool station on the turret, the turrets 14, 15 are rotated to the position illustrated so that the body 81 or 81a of the tool assembly 49 becomes disposed in coupling relation to the coupling means 53 as shown. The tool raising and lowering means 12, with no tooling thereon, is first raised so that the tool support surface 32 or 33 engages the lower side of the die 41, 41a. This is done by extending the rod 20 of the actuator 19. Then the actuator 18 is energized or actuated and the piston rod 47 acting through the detents 72 drives the tool support plunger 52 and hence the body 81 or 81a of the tool assembly 49 in a downward direction. First, the stripping sleeve 84 or 84a engages the die 41 or 41a, and shortly thereafter the punch 83 or 83a enters the opening in the die 41 or 41a. Continued downward movement causes alignment of the retainer 88 or 88a with the groove 87, 87a to enable the retainer 88 to move radially outwardly to unlock the tool 42, 42a. Shortly before such unlocking position is reached, the die 41, 41a becomes unseated from the turret 15, overpowering a detent 89 (FIG. 3). At the time that the retainer 88, 88a reaches the groove 87, 87a, the enlarged head 68 on the tooling support plunger 52 engages the abutment or shoulder 69 to arrest its movement at such position where the retainer 88, 88a is in its unlocked position. The position that the components as described to this point now have is illustrated in FIG. 6 which shows the tooling support plunger 52 fully extended to place the tool assembly 49 in an unlocking positions but with the tool ejecting plunger 50 still fully retracted within the tooling support plunger 52. (For convenience, the tool raising and lowering means 12 have been omitted form FIG. 6, but are in reality present at that point in the operation.) Simultaneously with the movement of the die 41a out of its operating position in the lower turret 15, the fluid actuator 19 is either overpowered by the fluid actuator 18, or is otherwise retracted at the same rate so that the tool support surface 33 continues to remain in engagement with the lower side of the die 41a.

The next phase of the operation continues automatically, because the frame 16 reacts through the housing 17 on the lower abutment surface 68 of the enlarged head 63 of the tooling support plunger 52 to arrest it and thus hold the detent means 72 in a vertically stationary position while power is still being applied to the actuator 18. Thus the piston rod 47 continues its downward movement by overpowering the detent means 72 and driving the tool ejecting plunger 50 in a downward direction. The lower end of the tool ejecting plunger 50 enters the bore 82, 82a and engages the upper end of the shank 85, 85a to break any oil lock, to overcome friction, to cam the retainer 88, 88a radially outwardly, and thus to move the tool 42, 42a downwardly and away from the body 81, 81a, moving the tool 42, 42a through the die opening in the lower turret 15, and during all of this time the raising and lowering means 12 continues to move downwardly toward its fully retracted position as shown in FIG. 1. The downward movement of the tool ejecting plunger 50 is arrested when its head 51 reaches the lower end of the bore 79 as shown in FIG. 7. FIG. 7 thus illustrates the tool loader and unloader 11, 12 with both of the plungers 50, 52 fully extended to their lowermost positions but with the tool raising and lowering means 12 not yet fully retracted. The tool raising and lowering means 12 after the relative position of components is reached as shown in FIG. 7, continues its downward movement to the fully retracted position as shown in FIG. 1, whereupon the tooling 41a, 42a may be removed therefrom.

As soon as the tool ejecting plunger 50 has performed all of the required functions described, that is, after the tool 42a has been moved out of engagement with the structure at the upper turret 14, the upper linear fluid actuator 18 may be retracted. If desired, such retraction can begin before the tool ejecting plunger 50 has reached its lowermost limit of travel. When retracting power is applied to the upper actuator 18, the detent means 77 will of course overcome any friction caused by detent means 72 and thus the rod 47 will raise the ejecting plunger 50 to the position shown in FIG. 6 whereupon the head 51 will engage the annular shoulder 71 to retract the tooling support plunger 52. Further retraction of the upper linear fluid actuator 18 will restore the components of the tool loader and unloader 11, 12 to the position shown in FIG. 5, or FIG. 1.

Assuming that a particular tool station 13 in the turrets 14, 15 has on tooling therein and that it is desired to use the tool loader and unloader 11, 12 to load tooling into such tool station, the tooling is placed on the tool raising and lowering means 12, as shown in FIG. 2, the turret 14, 15 being in or being moved to a position where the tool station 13 is in alignment with the tool loader and unloader 11, 12, whereupon the tool ejection means or upper portion 11 is moved from the retracted uppermost position of FIGS. 1 and 5 to the position shown in FIG. 6, and retained there. The position of the components show in FIG. 6 can be automatically signalled, if desired, by use of conventional limit switches (not shown) connected into the control circuit for the actuators 18, 19. Once the position of FIG. 6 is reached, the lower fluid actuator 19 is energized or extended so as to raise the tooling so that the punch and stripper sleeve assembly passes through the lower turret 15 into the upper turret 14 with the shank 85, 85a entering the body 81, 81a until the position shown in FIG. 6 is reached. At this point, upward movement is not terminated. However, at this point, the retainers 88, 88a become seated in the groove 86, 87a while the detent means 77 become overpowered. Prior to that point, the die 41, 41a has entered the lower turret 15 and the upward movement of the tool raising and lowering means 12 is continued so as to fully seat the die 41a in the lower turret 15. During the foregoing movement, the upper fluid actuator 18 was either simultaneously retracted or else overpowered by the lower fluid actuator 19. From this point and on, the upper fluid actuator 18 is energized or retracted to restore the components to the relative position illustrated in FIGS. 1 and 5. Once the die 41a has been seated in the lower turret 15, the tool raising and lower means 12 can be retracted to the position shown in FIGS. 1 and 2.

With the tool ejection means 11 fully raised but with no tooling in the upper turret 14, in place of the tooling 41, 42 on the tool raising and lowering means 12, there can be placed a suitable fixture having a comparable envelope which may be elevated in lieu of tooling by means of the tool raising and lowering means 12 as described to enable angular setting of angularly adjustable keying, for example of the type shown in FIGS. 5-7.

Although various minor modifications might be suggested by those versed in the art, it should be understood that I wish to embody within the scope of the patent warranted hereon all such embodiments as reasonably and properly come within the scope of the appended claims.

I claim as my invention:

1. A machine tool having a tool loader and unloader station for loading a tool into and for unloading a tool from a tool station of the machine tool, which comprises:
   a. a frame;
   b. a linear fluid actuator secured to said frame and having a piston rod;
   c. a housing having a pair of concentric upwardly directed tool-support surfaces each fixedly secured to aid rod to preclude relative vertical movement therebetween;
   d. a pair of flange members each slidably carried by said housing and respectively encircling said tool support surfaces, each of said flange members normally projecting upwardly from said tool support surfaces;

e. spring means acting between said housing and each of said flange members, and enabling said flange members to be returnably yieldable to a position flush with said tool support surfaces in response to engagement with the tool station; and f. tool ejection means on aid frame for coacting with said housing.

2. A machine tool according to claim 1 in which said tool-support surfaces are substantially coplanar.

3. A machine tool according to claim 1 which includes an elongated pilot rod acting between said housing and said frame, extending parallel to and offset from said piston rod, for preventing angular rotation of said housing about the longitudinal axis of said piston rod.

4. A machine tool according to claim 1 in which both of said flange members are keyed to said housing to preclude relative angular movement.

5. A machine tool according to claim 1 in which one of said tool support surfaces is on a portion of said housing which can be selectively rotated about the piston rod axis in a fixed axial position, and a lock member for locking the rotational position of said housing portion.

6. A machine tool according to claim 5 in which both of said flange members are keyed to said housing, the keying of one of aid flange members being to said rotatable housing portion.

7. A machine tool having a tool loader and unloader for loading a tool into and for unloading a tool from a tool station of the machine too, which comprises:

a. a frame;

b. a linear fluid actuator secured to said frame and having a piston rod;

c. a housing secured to said rod to preclude relative vertical movement therebetween, said housing having a portion which can be selectively rotated about the piston rod axis in a fixed axial position, said housing having an upwardly directed tool-support surface;

d. a flange member receptive of keyed tooling and slidably carried by said housing and encircling said tool support surface, said flange member normally projecting upwardly from aid tool support surface and being returnably yieldable to a position flush with said tool support surface in response to engagement with the tool station;

e. means keying said flange member to said rotatable housing portion for rotation therewith;

f. a lock member for locking the rotational position of said housing portion and flange member; and g. tool ejection means on said frame for coacting with said housing.

8. A machine tool according to claim 7 which includes an elongated pilot rod acting between said housing and said frame, extending parallel to and offset from said piston rod, for preventing angular rotation of said housing about the longitudinal axis of said piston rod.

9. A machine tool according to claim 7 which includes spring means acting between said housing and said flange member urging it toward its projecting position.

10. A machine tool having a work station, a tool loader and unloader station for loading a tool into and for unloading a tool from a movable tool station remotely from the work station of the machine tool, which comprises:

a. a frame;

b. a linear fluid actuator secured to said frame and having a piston rod;

c. means secured to said piston rod for both reciprocating a tool assembly in said tool station and also for positively ejecting a tool in such tool assembly in response to reciprocation of said piston rod, said reciprocating means being detachable from the tool assembly in response to movement of said tool station; and d. tool raising and lowering means secured to said frame for coaction with said reciprocating means on the tool.

11. A machine tool according to claim 10 in which said tool raising and lowering means comprises:

a. a second linear fluid actuator secured to said frame and having a piston rod;

b. a housing having a pair of concentric upwardly directed tool-support surfaces each fixedly secured to said last-named rod to preclude relative vertical movement therebetween; and c. a pair of flange members each slidably carried by said housing and respectively encircling said tool support surfaces, each of said flange members normally projecting upwardly from said tool support surfaces and being returnably yieldable to a position flush with said tool support surfaces in response to engagement with the work station.

12. A machine tool according to claim 10 in which said tool raising and lowering means comprises:

a. a second linear fluid actuator secured to said frame and having a piston rod;

b. a housing secured to said last-named rod to preclude relative vertical movement therebetween, said housing having a portion which can be selectively rotated about the piston rod axis in a fixed axial position, said housing having an upwardly directed tool-support surface;

c. a flange member receptive of keyed tooling and slidably carried by said housing and encircling said tool support surface, said flange member normally projecting upwardly from said tool support surface and being returnably yieldable to a position flush with said tool support surface in response to engagement with the tool station;

d. means keying said flange member to said rotatable housing portion for rotation therewith; and e. a lock member for locking the rotational position of said housing portion and flange member.

13. A machine tool according to claim 10 in which said reciprocating and ejecting means comprises:

a. a tool ejecting plunger secured to said piston rod;

b. a tooling support plunger reciprocably guided by said frame, and having means at its lower end for coupling with the tooling; and c. means providing a driving connection between said plungers by which said tool ejecting plunger is enabled to reciprocate said tooling support plunger in both directions and to move relatively thereto.

14. A machine tool according to claim 13 in which said coupling means is detachably clamped to the lower end of said tooling support plunger.

15. A machine tool according to claim 13 which includes keying acting angularly between said frame and said tooling support plunger.

16. A machine tool according to claim 13 which includes a retractable pin carried by said frame for selectively locking said tooling support plunger in a retracted position.

17. A machine tool according to claim 13 which includes detent means acting between said tooling support plunger and said frame, and so located as to tend to hold said tooling support plunger in an extended position.

18. A machine tool according to claim 13 which includes an enlarged head on said tooling support plunger disposed externally of said actuator, and engageable with fixed abutments on said frame external to said actuator for limiting the extent of travel of said tooling support plunger.

19. A machine tool according to claim 13 which includes an enlarged head on said ejecting plunger disposed externally of said actuator, and engageable with spaced abutments on said tooling support plunger external to said actuator for limiting the extent of travel of said ejecting plunger.

20. A machine tool according to claim 13 which includes an enlarged head on said ejecting plunger disposed externally of said actuator between spaced shoulders on said tooling support plunger external to said actuator, said head being engageable with the upper of said shoulders to form at least part of said driving connection.

21. A machine tool according to claim 13 which includes detent means acting to connect said plungers and forming at least part of said driving connection.

22. A machine tool according to claim 21 in which said detent means acts between said tooling support plunger and said piston rod.

23. A machine tool according to claim 13 which includes a housing secured to said frame and providing the guidance for said tool support plunger and the support for said linear fluid actuator.

24. A machine tool according to claim 17 which includes second detent means acting to connect said plungers and forming at least part of said driving connection.

25. A machine tool according to claim 18 which includes a retractable pin carried by said frame for selectively locking said enlarged head adjacent to the upper of said abutments.

26. A machine tool according to claim 20 in which said spaced shoulders are annular, are disposed within said tooling support plunger in encircling relation to said tool ejecting plunger.

27. A machine tool according to claim 13 in which said driving connection includes:
 a. detent means acting to connect said plungers for joint downward movement;
 b. a head on said ejecting plunger external to said actuator; and
 c. a shoulder on said tooling support plunger engageable by said head for joint upward movement.

* * * * *

UNITED STATES PATENT OFFICE
CERTIFICATE OF CORRECTION

Patent No. 3,628,231          Dated December 21, 1971

Inventor(s) James J. Pancook

It is certified that error appears in the above-identified patent and that said Letters Patent are hereby corrected as shown below:

Col. 3, line 12 change "the" (third occurrence) to --by--.

Col. 3, line 19 change "lower" to --lowering--.

Col. 4, line 2 change "position" to --piston--.

Col. 4, line 41 correct the spelling of "preferable".

Col. 5, line 36 correct the spelling of "position".

Col. 6, line 16 change "on" to --no--.

Col. 6, line 25 correct the spelling of "shown"

Col. 6, line 35 change "87a to --86a--.

Col. 6, line 46 change "lower" (second occurrence) to --lowering--.

Col. 6, line 70 change "aid" to --said--.

Col. 7, line 6 change "aid to --said--.

Col. 7, line 29 change "too" to --tool--.

Col. 7, line 41 change "aid" to --said--.

Signed and sealed this 11th day of July 1972.

(SEAL)
Attest:

EDWARD M. FLETCHER, JR.
Attesting Officer

ROBERT GOTTSCHALK
Commissioner of Patents